Feb. 26, 1935. J. H. RITTER 1,992,444
APPARATUS FOR HANDLING GLASS BATCHES
Filed Nov. 28, 1931
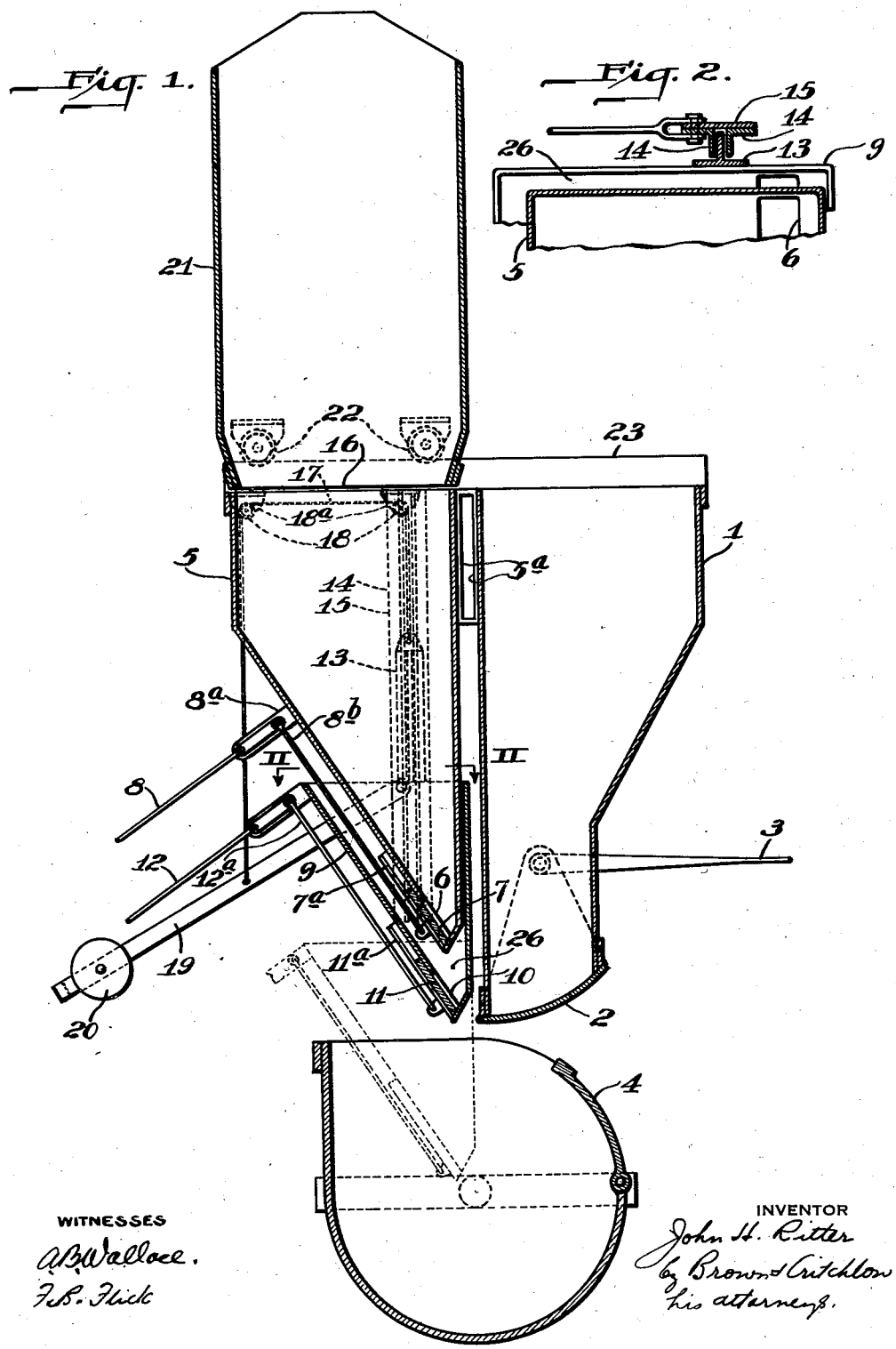
WITNESSES
INVENTOR
John H. Ritter
by Brown & Critchlow
his attorneys.

Patented Feb. 26, 1935

1,992,444

UNITED STATES PATENT OFFICE 1,992,444

APPARATUS FOR HANDLING GLASS BATCHES

John H. Ritter, Charleroi, Pa.

Application November 28, 1931, Serial No. 577,769

1 Claim. (Cl. 221—118)

This invention relates to apparatus for handling glass batches, and more particularly to apparatus for filling glass-furnace charging means.

In making glass it is desirable that the formation of dust in handling the batch be minimized as much as possible, because some glasses are sensitive to changes in the proportionate amounts of their ingredients, and because such dust may find its way into another batch, or into a glass melt, and cause harmful results, such as discoloration. Moreover, these dusts may injure the throats and lungs of the glass workers. My Patent No. 1,810,730, issued June 16, 1931, shows a glass-furnace charging apparatus which eliminates the dust formerly attendant upon the charging operation itself. While that apparatus satisfactorily overcomes dusting incident to charging batch into glass tanks, dust may still be created in filling the furnace chargers, as from bins or hoppers containing the batch.

It is an object of this invention to provide means for transferring glass batch from a hopper to a furnace charger which minimizes or eliminates dust formation. Other objects and advantages will appear hereinafter.

The invention is illustrated in the accompanying drawing of which Fig. 1 is a vertical section through the preferred embodiment; and Fig. 2 is an enlarged fragmentary sectional view taken on line II—II of Fig. 1.

In accordance with the invention dusting is minimized in transferring batch material from a storage bin to a container by an apparatus including means for receiving a charge of said material from the bin and transporting it to and depositing it in the container and adapted to avoid substantial fall or turbulence of the batch material in being thus moved. The preferred embodiment of this invention comprises a bin having a closable outlet in its lower end, a hopper associated with the outlet end of the bin and having a normally closed outlet in its lower end, and means for reciprocating the hopper toward and away from the bin to deposit the charge which it receives from the bin in a transportable container. The bin may contain a completely compounded batch mix, but preferably there is stored in it a mixture of batch materials without cullet, this latter being stored in another bin. As cullet is dustless, it is not necessary to provide its bin with the reciprocating hopper of this invention.

Referring to the drawing, the apparatus comprises a cullet bin 1 provided with an outlet in its lower end controlled by a closure member 2 operated by a lever 3. The bin is adapted to pour charges of its contents into a transportable container 4 below, that shown in the drawing being the furnace-charging apparatus of my patent mentioned above. It is preferred to store the cullet separately, so that it may be added according to need to batches of otherwise varying composition.

In accordance with this invention batch is stored in a second bin 5 mounted beside the cullet bin, the upper portions of the two bins preferably being joined, as by structural members 5a, to form a unitary structure. The lower end of this bin is provided with an outlet 6 normally closed by a door 7 slidably mounted in guides 7a connected to bin 5. Door 7 is reciprocated in its guides by means of a lever 8 pivotally mounted in a bracket 8a connected to bin 5. A link 8b pivotally mounted on lever 8 and door 7 connects the two.

If the batch were run directly from bin 5 into furnace charger 4 beneath it, as happens in the case of the cullet, the fall and resultant disturbance of the batch would cause considerable dust to be created, which would be apt to produce the harmful results already mentioned. The dust from this operation is minimized or eliminated by reducing the distance which the material falls in being transferred from the bin to the charging apparatus. This is accomplished in the apparatus shown by providing a hopper 9 having substantially the same shape as the lower end of the bin so that it can telescope thereover. It is adapted to receive a charge of batch from bin 5 and to transport it into furnace charger 4 and there deposit it without substantial fall. The hopper is provided at its lower end with an outlet 10 normally closed by a door 11 slidable in guides 11a and operated by a lever 12 and link 12a, as in the case of door 7. Longitudinally disposed T-members 13, Fig. 2, are connected to opposite sides of the hopper. The outwardly disposed legs of T-bars 13 are slidably disposed in vertical guideways, formed, for example, as shown in Fig. 2, of angle irons 14 connected to a plate 15, the guides thus formed being rigidly suspended from plates 16 connected to the top of bin 5.

To permit the hopper to be reciprocated vertically it is hung from cables 17 attached to the upper ends of T-members 13 and passing over pulleys 18 held in brackets 18a connected to bin 5. The opposite ends of cables 17 are connected to a pair of levers, or arms, 19 each of which is pivotally connected at one end to plate 15, as shown in Fig. 1. The extended ends of arms 19 are joined by a weighted bar 20 which acts as a counterweight to hold the hopper in elevated position around the lower end of bin 5. Weight 20 normally holds hopper 9 in raised position, as shown in full lines, Fig. 1. Upon raising arms 19, the hopper is lowered to its discharging position, shown fragmentarily in dotted lines.

Bins 1 and 5 are filled preferably by a bin charger 21, filled with cullet or batch, as the case may be, at any convenient point. The charger is provided with wheels 22 which run on angle iron rails 23 mounted on top of the bins. The bottom of the charger is provided with a closable discharge port which registers with and covers the opening in the top of either bin to close the opening and prevent escape of dust when material is delivered from the charger into the bin.

The operation of the apparatus is simple. In its raised position the hopper surrounds the lower end of bin 5 leaving a space 26 between their walls. Bin 5 having been filled by charger 21, a measured amount of batch is delivered from the bin to the hopper, through outlet 6, the door being opened by means of lever 8. Due to the proximity of the hopper to the outlet, the fall is slight and the batch is not disturbed enough to raise any appreciable amount of dust. The small amount of dust that may be raised is shielded from air currents by the walls of the hopper and bin and therefore settles back.

The hopper with its load of batch is moved downwardly in the guideway formed by angles 14, by raising arms 19 until its lower end rests on a charge of cullet which has previously been poured into charger 4 from bin 1. Lever 12 is then raised to move door 11 and open the outlet in the hopper, whereupon the batch charge carried by the hopper runs into the furnace charger. Here again there is little disturbance of the material, because there is such a small drop from the hopper into the charger. The result is that the batch is transported from the batch storage bin into the furnace charger with substantially no dust rising into the air.

It can be seen that this apparatus, though simple in construction and operation eliminates turbulent dust-forming transfer of batch, and thus overcomes the disadvantages heretofore attending this operation, so that it assists in improving hygienic conditions and in perfecting the manufacturing of glass.

According to the provisions of the patent statutes, I have explained the construction and operation of my invention, and have described what I now consider to be its best embodiment. However, I desire to have it understood that, within the scope of the appended claim, the invention may be practiced otherwise than as specifically described.

I claim:—

The combination with a bin for containing a multi-charge supply of dust-forming material and having an outlet in its lower end, a movable door for said outlet, and means for actuating said door, of a charging hopper telescoping over said outlet end of said bin and having a normally closed discharge port in its lower end, a closure for said port, means for actuating said closure, said hopper receiving a charge of said material from said bin, counterweighted cables supporting said hopper to permit it to be reciprocated vertically with respect to the bin to convey said material from said bin into a transportable container and there deposit its charge upon opening said normally closed discharge port, and guides and guideways associated with said hopper and said bin respectively to prevent said hopper from swinging horizontally, said material being transferred from said bin to said hopper and thence to said container without substantial fall, whereby dusting of said material is minimized.

JOHN H. RITTER.